United States Patent
Naito et al.

(10) Patent No.: US 7,456,735 B2
(45) Date of Patent: Nov. 25, 2008

(54) PORTABLE DEVICE FOR ELECTRONIC KEY SYSTEM AND SYSTEM FOR REMINDING USER TO CARRY PORTABLE DEVICE

(75) Inventors: Hiromichi Naito, Okazaki (JP); Kenichi Ogino, Toyota (JP)

(73) Assignee: DENSO CORPORATION, Kariya (JP)

( * ) Notice: Subject to any disclaimer, the term of this patent is extended or adjusted under 35 U.S.C. 154(b) by 541 days.

(21) Appl. No.: 11/159,259

(22) Filed: Jun. 23, 2005

(65) Prior Publication Data

US 2006/0043181 A1    Mar. 2, 2006

(30) Foreign Application Priority Data

Aug. 27, 2004    (JP)    ............... 2004-248523

(51) Int. Cl.
  *G08B 1/08*    (2006.01)
  *H04Q 7/00*    (2006.01)
(52) U.S. Cl. .............................. 340/539.11; 340/568.1; 340/539.32
(58) Field of Classification Search ............ 340/539.11, 340/539.32, 566, 568.1, 571, 692; 455/404.1, 455/404.2, 407, 412.2, 425, 550.1
See application file for complete search history.

(56) References Cited

U.S. PATENT DOCUMENTS

| | | | | |
|---|---|---|---|---|
| 5,289,163 A | * | 2/1994 | Perez et al. ............ | 340/539.32 |
| 5,963,131 A | * | 10/1999 | D'Angelo et al. ........ | 340/568.1 |
| 6,133,830 A | * | 10/2000 | D'Angelo et al. ........... | 340/571 |
| 7,151,446 B2 | * | 12/2006 | Culpepper et al. ..... | 340/539.32 |
| 7,266,378 B2 | * | 9/2007 | Norta et al. .............. | 455/550.1 |
| 2003/0095039 A1 | | 5/2003 | Shimomura et al. | |
| 2006/0217105 A1 | * | 9/2006 | Kumar et al. ............ | 455/404.1 |
| 2007/0030164 A1 | * | 2/2007 | Lim ...................... | 340/539.32 |

FOREIGN PATENT DOCUMENTS

| | | |
|---|---|---|
| JP | A-H10-331495 | 12/1998 |
| JP | A-2000-170420 | 6/2000 |
| JP | A-2000-326827 | 11/2000 |

* cited by examiner

*Primary Examiner*—John A Tweel, Jr.
(74) *Attorney, Agent, or Firm*—Posz Law Group, PLC

(57) ABSTRACT

A portable device in an electronic key system has a motion detection sensor to detect its motion from a continuation of standing state over a specified period of time, sound and vibration are generated. This sound and vibration make the user aware that he or she carries the portable device. The user thus is reminded of carrying the portable device whenever he or she goes out. If the motion detection sensor detects a larger motion, the sound and vibration are generated without checking the specified period of time. The motion may also be reported to handy equipment, which is separate from the portable device and carried by the user.

17 Claims, 9 Drawing Sheets

PORTABLE DEVICE FOR ELECTRONIC KEY SYSTEM AND SYSTEM FOR REMINDING USER TO CARRY PORTABLE DEVICE

CROSS REFERENCE TO RELATED APPLICATION

This application is based on and incorporates herein by reference Japanese Patent Application No. 2004-248523 filed on Aug. 27, 2004.

FIELD OF THE INVENTION

The present invention relates to a portable device for an electronic key system and a system for reminding to carry the same.

BACKGROUND OF THE INVENTION

For vehicles, various electronic key systems are proposed. In one system, in response to a request (transmission request signal) transmitted from an on-vehicle device, a portable device as an electronic key carried by a user of the vehicle transmits a reply signal containing an identification code. If the code that the on-vehicle device receives from the portable device coincides with a code stored in advance in a memory of the on-vehicle device, predetermined operations such as door unlocking/locking and engine startup are performed. Such an electronic key system is generally referred to as a smart key system and a smart keyless entry system (e.g., JP-2000-170420A and U.S. 2003/0095039A1 (JP-2003-157483A)).

In the above electronic key system, desired functions (door unlocking, locking, etc.) are achieved if the user only carries the portable device without performing intentional operations on the portable device. The user therefore often leaves the portable device in a bag, a purse, a coat pocket, or the like.

Therefore, when the user forgets to carry the portable device, he or she becomes aware of not carrying it for the first time when functional operations such as door unlocking are not performed though he or she approaches the vehicle.

SUMMARY OF THE INVENTION

The present invention aims at reminding a user of carrying a portable device as an electronic key in an electronic key system.

A portable device for an electronic key system according to the present invention detects its motion from its standing state and reports to a user that the portable device has moved in response to a detection of the motion from the standing state. The report may be vibration of or sound from the portable device.

Preferably, the report is made only when the motion is detected after a continuation of the standing state over a first period of time.

Preferably, the portable device also detects stronger motion occurring continuously over a second period of time shorter than the first period of time and reports to the user that the portable device has moved. This report is made irrespective of an elapse of the first period of time.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS

Figure 1:
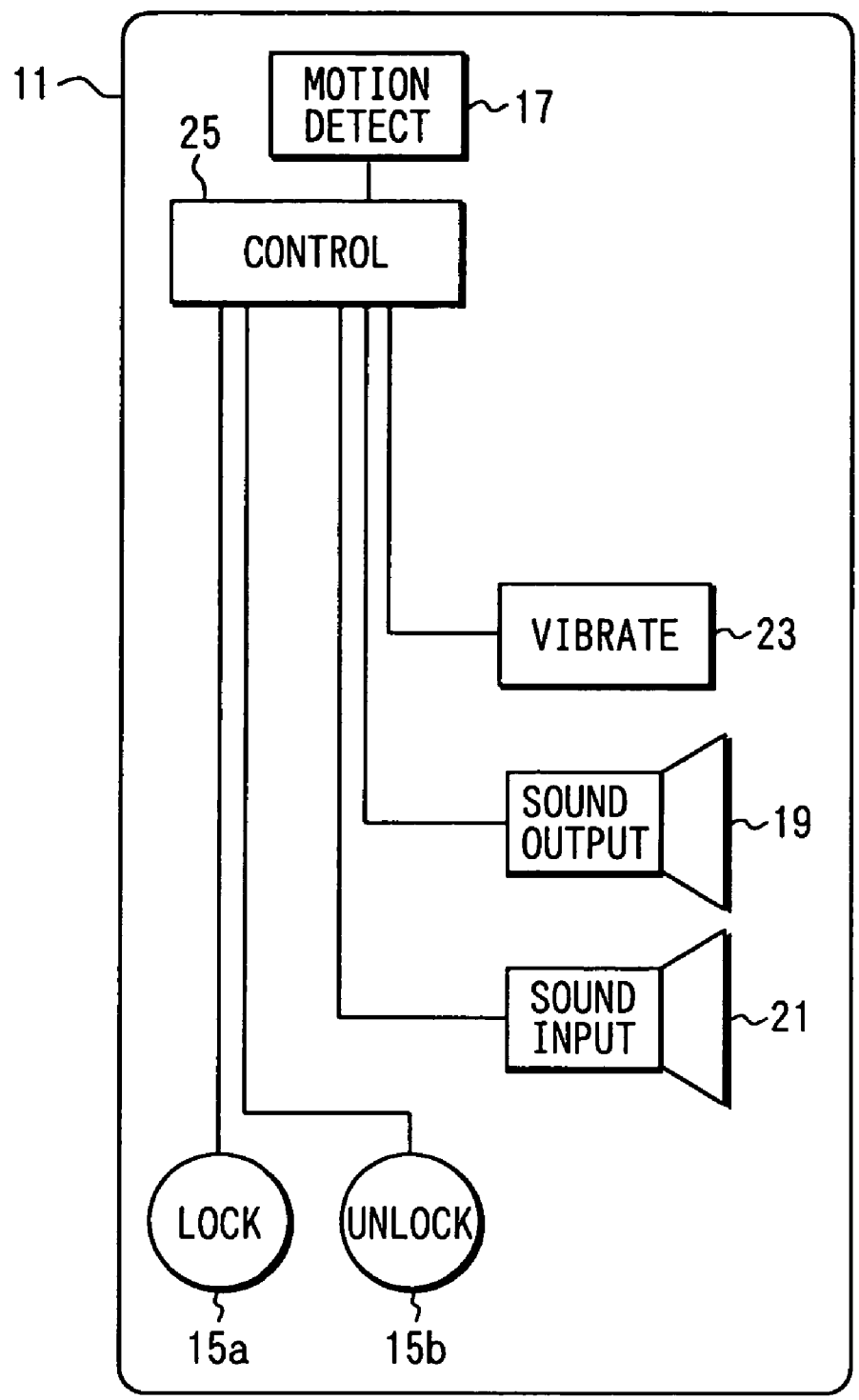
FIG. 1 is a block diagram showing a portable device according to a first embodiment of the present invention.

Portable devices in the following embodiments are those carried by a user as electronic keys in electronic key systems for automobiles. The electronic key systems serve both as smart key systems (smart keyless entry systems) in which doors are unlocked when an authorized portable device (portable device dedicated to a vehicle) enters a wireless communication area around the vehicle, and as remote keyless entry systems (hereinafter referred to as RKE) in which doors are locked and unlocked by the users pressing buttons provided in the authorized portable device.

First Embodiment

The functions (the functions of a smart key system and RKE) of the electronic key system in which the portable device 11 is used will be summarized although known. A vehicle is provided with: a transmitter (on-vehicle transmitter) that transmits a transmission request signal to a wireless communication area around the vehicle; a receiver (on-vehicle receiver) that receives radio waves from the portable device 11; and a control unit (on-vehicle control unit) connected to the transmitter and the receiver.

(1) First, the functions of a smart key system will be summarized.

(1-1) The on-vehicle control unit periodically transmits a transmission request signal from the on-vehicle transmitter.

(1-2) When the portable device 11 enters a wireless communication area in which the transmission request signal from the on-vehicle transmitter can be received, and receives the transmission request signal, as a reply signal, it transmits a smart radio wave containing a smart ID code specific to a vehicle corresponding to the portable device 11.

(1-3) When the smart radio wave from the portable device 11 is received by the on-vehicle receiver during parking in which all doors of the vehicle are closed and locked, the on-vehicle control unit determines whether the smart ID code contained in the received radio wave coincides with a smart ID code (smart ID code specific to the vehicle in which the control unit is mounted). If they coincide with each other, the control unit permits the doors to be unlocked. Furthermore, with the doors permitted to be unlocked, for example, by a signal from a touch sensor provided in an external door knob of a driver's seat compartment, on detecting that a person touches the door knob, the on-vehicle control unit drives a door lock motor to unlock all doors.

(2) Next, the functions of RKE will be summarized.

(2-1) In the RKE, when a user of the vehicle presses a lock button 15a or an unlock button 15b of the portable device 11, an RKE radio wave containing an RKE ID code specific to the vehicle corresponding to the portable device 11 is transmitted from the portable device 11. When the lock button 15a of the portable device 11 is pressed, operation command information indicating a lock operation is contained in the RKE radio wave. When the unlock button 15b is pressed, operation command information indicating an unlock operation is contained in the RKE radio wave. The lock button 15a and the unlock button 15b of the portable device 11 are switches of button type that are turned on when pressed.

(2-2) When the RKE radio wave from the portable device 11 is received by the on-vehicle receiver, the on-vehicle control unit determines whether the RKE ID code contained in the received radio wave coincides with an RKE ID code (RKE ID code specific to the vehicle in which the control unit is mounted). If they coincide with each other, according to the operation command information contained in the received radio wave together with the RKE ID code, the door lock motor is driven to lock or unlock all doors.

The portable device 11 includes: a motion detection sensor 17 for detecting the motion of the portable device 11; a sound output part 19 comprising a speaker for outputting sounds; a sound input part 21 (corresponding to a sound input means) comprising a microphone for inputting sounds from the exterior; a vibration generation part 23 comprising a motor for generating vibration; an antenna and a transmitting/receiving part (not shown) for performing wireless communications with the on-vehicle control unit; and a control part 25 comprising a microcomputer controlling the operation of the portable device 11.

An acceleration sensor may be used as the motion detection sensor 17. It is also possible to use a vibration sensor for detecting vibration and an inclination sensor for detecting inclination, and use two or more of plural types of the sensors in combination.

Figure 2:
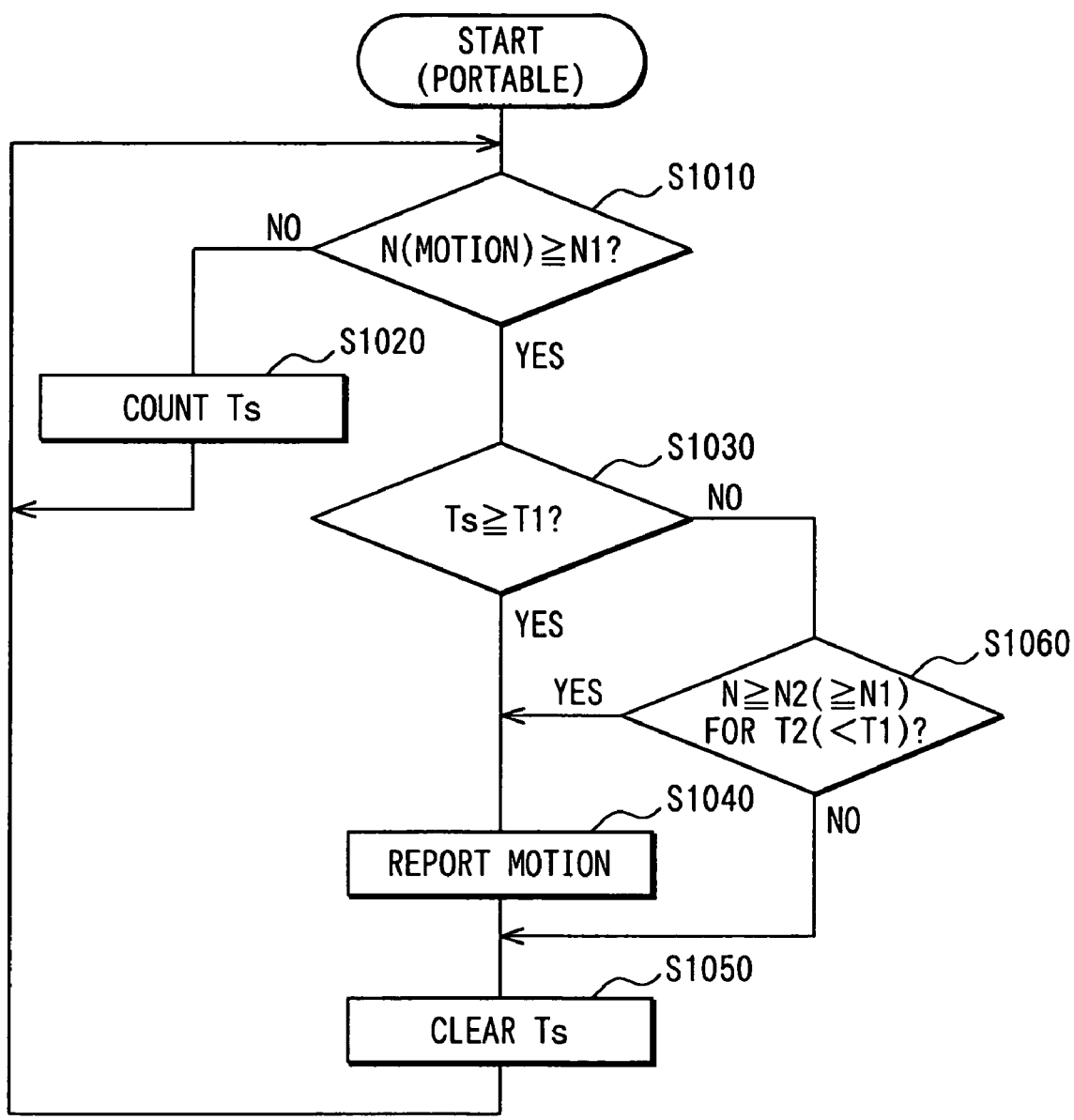
FIG. 2 is a flowchart showing processing performed in a control part of a portable device to remind a user of carrying the portable device.

As shown in FIG. 2, the control part 25 of the portable device 11 determines at S1010 whether the motion N detected by the motion detection sensor 17 (in this example, the acceleration of the portable device 11 detected by the sensor 17) is equal to or greater than a first reference value N1. If not greater than the first reference value N1 (S1010: NO), the control part 25 determines that the portable device 11 is standing (stationary), and executes S1020. At S1020, the control part 25 counts a period (standing period) Ts during which the portable device 11 is standing, not in motion, and then repeats S1010.

At S1010, on determining that the motion detected by the motion detection sensor 17 is equal to or greater than the first reference value N1 (S1010: YES), the control part 25 determines that the portable device 11 is moving, and executes S1030. At S1030, the control part 25 determines whether the standing period Ts counted at S1020 is equal to or greater than a first period of time (e.g., three minutes) T1. If Ts≧T1 (S1030: YES), at S1040, it reports to the user that the portable device 11 has moved after its continued standing condition, by generating vibration in the vibration generation part 23 while generating a specific sound (e.g., a buzzer sound) in the sound output part 19 for a fixed period of time. Then, the control part 25 clears the standing period Ts to zero at S1050, and repeats S1010.

On determining at S1030 that the standing period Ts is not greater than the specified time T1 (S1030: NO), the control part 25 executes S1060 to determine whether the motion detected by the motion detection sensor 17 has been equal to or greater than a second reference value N2 greater than the first reference value N1 over a second period of time T2 (e.g., two seconds or more) shorter than T1.

When negative determination is made at S1060, the control part 25 executes S1050. When positive determination is made at S1060, that is, the motion detected by the motion detection sensor 17 has been equal to or greater than the second reference value N2 over the fixed period of time T2, the control part 25 executes S1040 to generate vibration in the vibration generation part 23 while generating a specific sound in the sound output part 19 for a fixed period of time, and then executes S1050.

Figure 3:
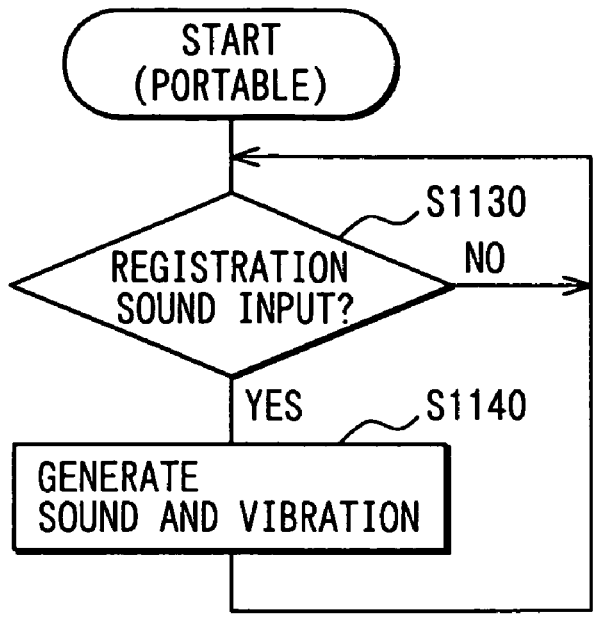
FIG. 3 is a flowchart showing processing performed in a control part of a portable device so that a user can easily locate the portable device.

In the above embodiment, it is preferred that the user is enabled to easily locate the portable device 11 when the user cannot remember where the portable device 11 has been placed. As shown in FIG. 3, it is possible to locate the portable device 11. In this case, the control part 25 of the portable device 11 controls a sound registration operation by the user. As the sound registration operation, an operation not related to the normal functions of the portable device 11 is performed; for example, the lock button 15a and the unlock button 15b are pressed consecutively twice at the same time within a specified time. This may be done at any time other than searching for the portable device 11.

If a sound such as user's voiced words is input, the control part 25 analyzes sound inputted from the sound input part 21, stores (registers) the contents of words indicated by the sound in an internal memory as registration sound.

When the user needs to search the portable device 11, the user voices words at a place where the portable device 11 will be located. The control part 25 analyzes the sound inputted by the sound input part 21 and determines at S1130 whether the sound is a sound representing the same words as the registered sound. In short, it determines whether the registration sound has been inputted.

When determining that no registration sound is inputted (S1130: NO), the control part 25 repeats to execute S1130. When determining that the registration sound is inputted (S1130: YES), it proceeds to S1140 to generate vibration in the vibration part 23 while generating a specific sound (buzzer sound) in the sound output part for a specific period of time, and then repeats to execute S1130. This vibration and the specific sound will indicate the place of location of the portable device 11.

In registering the user words as the registered reference for use at S1130, the quality of inputted sound (sound quality)

may also be stored in the memory. At S1130, when sound by the sound input part 21 has stored sound quality and is a sound representing the stored words, it may be determined that registration sound has been inputted.

The portable device 11 of the first embodiment described above reminds the user to carry the portable device 11 thus helping to prevent the user from forgetting to carry the same 11.

That is, when the user carries the portable device 11, the portable device 11 moves together with the behavior of the user. The portable device 11 is moved after it is standing over a fixed period of time (T1), and when the transition from the standing state to the moving state is detected at S1010 of FIG. 2 (positive determination is made at S1010), positive determination is made at S1030 of FIG. 2, and sound and vibration are generated from the portable device 11 at S1040 to report to the user that the portable device 11 has moved. As a result, the sound and vibration make the user become aware that he or she carries the portable device 11. Thus, the user always has the consciousness that sound and vibration are generated whenever he or she goes out. As a result, for example, if the user is to go out without carrying the portable device 11, the user will immediately recognize forgetting to carry the portable device 11 because the sound and vibration are not generated which should be generated whenever the user goes out.

Furthermore, the portable device 11 of the first embodiment generates sound and vibration at S1040 only after it is continuously determined at S1010 of FIG. 2 over the specified period of time T1 that the portable device 11 is standing and then it is determined at S1010 that the portable device 11 is moved (S1010: YES, and S1030: YES). In short, unless the standing state continues over the specified period of time T1, the processing of S1040 is not performed even if it moves. Therefore, the user is freed from the annoyance of the sound and vibration generated each time the portable device 11 moves, and undesired consumption of an internal battery of the portable device 11 can be restricted.

In the portable device 11 of the first embodiment, when negative determination is made at S1030 of FIG. 2, that is, when it is determined at S1010 that the portable device 11 has moved but the standing period Ts having been accumulated as a result of negative determination so far at S1010 is less than the specified time T1, it is determined at S1060 whether the portable device 11 has been moving continuously over a fixed period of time with a degree more than N2 greater than the degree N1 with which it is determined at S1010 that the portable device 11 has moved. If positive determination is made at S1060, sound and vibration are generated at S1040.

Therefore, even if the portable device 11 has been standing for less time than the specified period of time (T1), if the portable device 11 is moved strongly to such a degree that positive determination is made at S1060, sound and vibration are generated. Therefore, to locate the portable device 11, if the user intentionally strongly swings a jacket or bag containing the portable device 11, sound and vibration will be generated regardless of the period Ts of the standing state. Hence, the user never fails to confirm the existence of the portable device 11 if he or she needs the confirmation.

Furthermore, according to the portable device 11 of the first embodiment, since processing of FIG. 3 is performed, when the user becomes aware of forgetting to carry the portable device 11 but forgets where it was housed, if the user utters the same words as registration sound registered in advance in the portable device 11, he or she will be able to easily locate the portable device 11. If user's sound arrives in the portable device 11 and it is determined that registration sound is inputted (S1130: YES), like S1040 of FIG. 2, sound and vibration are generated from the portable device 11 (S1140).

At S1040 of FIG. 2 and S1140 of FIG. 3, only one of sound and vibration may be generated to report the location of the portable device 11.

Second Embodiment

Figure 4:
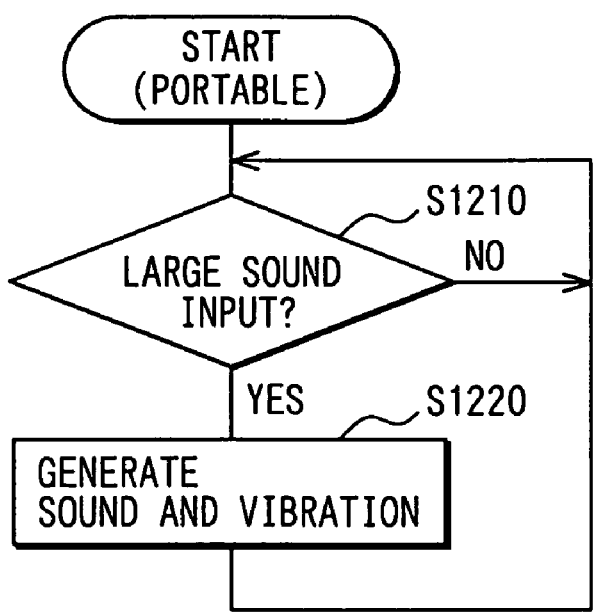
FIG. 4 is a flowchart showing processing performed in a control part of a portable device according to a second embodiment of the present invention so that a user can easily locate the portable device.
Figure 5:
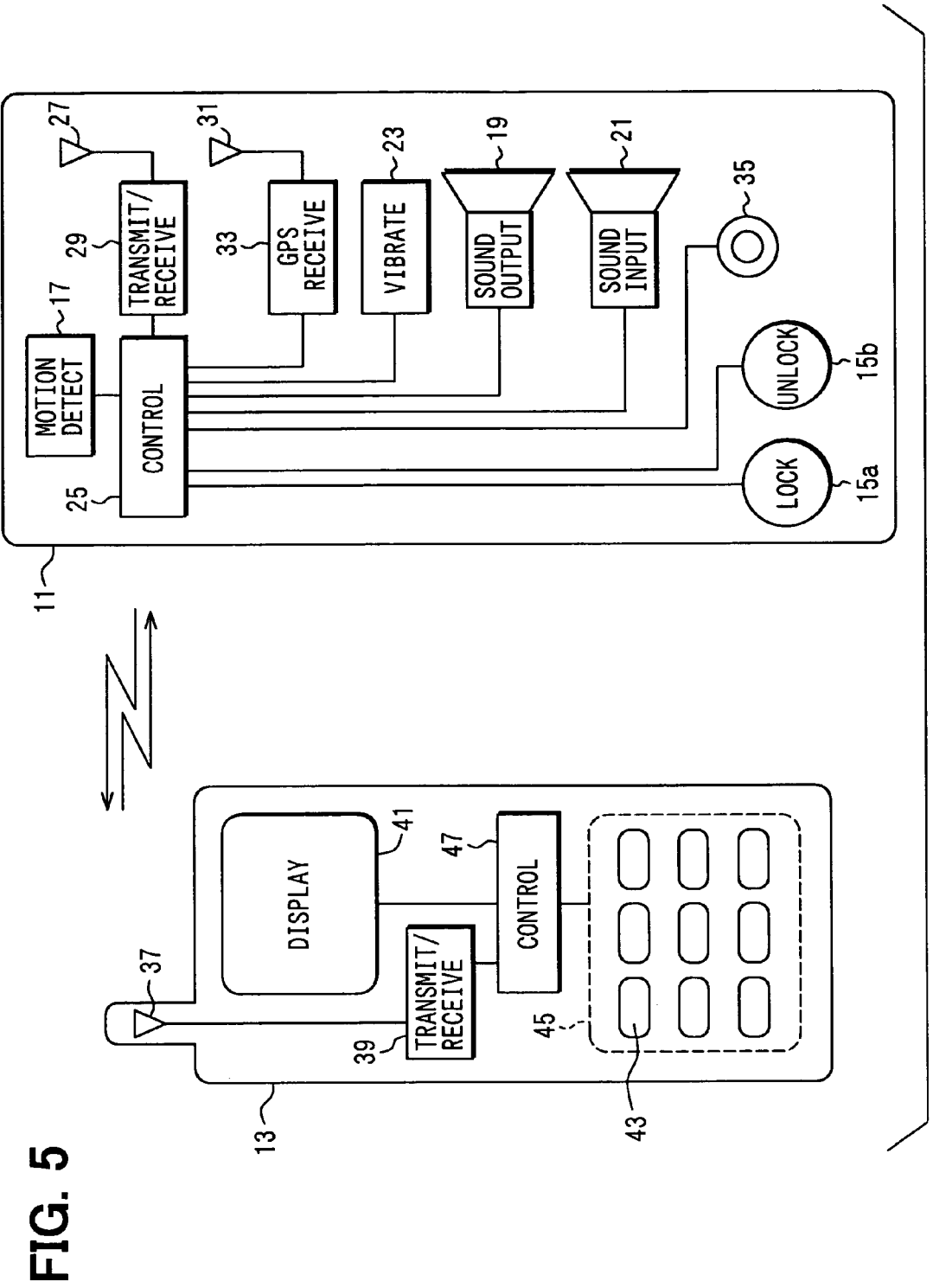
FIG. 5 is a block diagram showing a system for reminding a user of carrying a portable device according to a third embodiment of the present invention.

The portable device 11 according to the second embodiment is different from that of the first embodiment only in that the control part 25 of the portable device 11 performs processing of FIG. 4 instead of processing of FIG. 3.

As shown in FIG. 4, the control part 25 of the portable device 11 determines at S1210 whether the magnitude of a sound inputted to the sound input part 21 by the user is equal to or greater than a specified value (whether a volume equal to or greater than the specified value has been inputted), and waits until a volume equal to or greater than the specified value is inputted. On determining that a volume equal to or greater than the specified value has been inputted (S1210: YES), the control part 25 proceeds to execute S1220 to generate vibration in the vibration part 31 while generating a specific sound (buzzer sound) in the sound output part 23 for a specified time, and ten repeats to execute S1210.

Also in the second embodiment, when searching for the lost portable device 11, the user can easily locate it if it is comparatively near the user, even when the portable device 11 is held standing.

That is, if such a noise as to cause positive determination at S1210 of FIG. 4 is made by issuing sound or tapping something, specific sound and vibration are generated from the portable device 11 (S1220). At S1220, only one of sound and vibration may be generated.

Third Embodiment

The third embodiment is directed to a portable device search system which is formed as a combination of the portable device 11 and a handy equipment 13, which the user carries with him or her. The equipment 13 need not be related to a vehicle operation. The handy equipment 13 may be mobile equipment such as a cellular phone and PDA, or may be any handy equipment such as a remote control for other equipment such as television sets and air conditioners, or a remote control dedicated to the system for reminding a user of carrying a portable device.

In addition to the components of the portable device 11 of the first embodiment, the portable device 11 includes an antenna 27 and a transmitting/receiving part 29 for performing wireless communications with the handy equipment 13; an antenna 31 and a GPS receiving part 33 for receiving GPS signals from a GPS satellite; and a photographing part 35 comprising a camera for photographing a surrounding area of the portable device 11. The antenna 27 and the transmitting/receiving part 29 may be different from the antenna and the transmitting/receiving part for performing wireless communications with the on-vehicle control unit, or may be used in common with them.

The portable device 11 is different from the portable device 11 of the first or second embodiment in that it feeds transmission data to the transmitting/receiving part 29 to wirelessly transmit from the antenna 27 to the handy equipment 13 a command signal for reporting to the user that the portable device 11 has moved.

The handy equipment 13 includes: an antenna 37 and a transmitting/receiving part 39 for wirelessly communicating with the portable device 11; a display part 41 comprising a liquid crystal display and the like; an operation part 45 in which plural buttons (keys) including a search button 43 and plural numeric buttons (buttons marked with a number) are arranged; and a control part 47 comprising a microcomputer.

Figure 6:
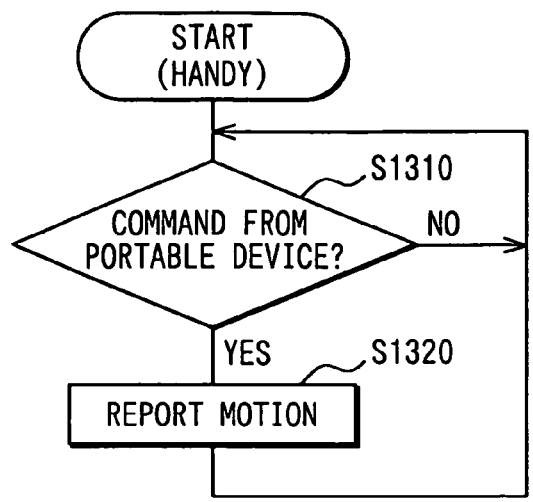
FIG. 6 is a flowchart showing processing performed in a control part of handy equipment to remind a user of carrying a portable device.

As shown in FIG. 6, in the handy equipment 13, the control part 47 determines at S1310 whether the command signal from the portable device 11 has been received by the antenna 37 and the transmitting/receiving part 39, and waits until the command signal is received. The command signal may be generated by the portable device 11 as a part of or in place of S1040 in FIG. 2.

On receiving the command signal (S1310: YES), at S1320, the control part 47 reports to the user that the portable device 11 has moved, by displaying in the display part 41 an image (e.g., message and icon) indicating that the portable device 11 has moved, and then repeats S1310.

As a result, the user can confirm that the portable device 11 has moved (the portable device 11 is carried by the user) from the image displayed in the display part 41 of the handy equipment 13.

In the system for reminding a user of carrying a portable device of the third embodiment, the fact that the portable device 11 has moved is reported to the user by displaying an image in the display part 41 of the handy equipment 13 instead of generating sound and vibration from the portable device 11. This system also helps to prevent the user from forgetting to carry the portable device 11 like the first and the second embodiments.

At S1320, to report to the user that the portable device 11 has moved, vibration may be generated together with a specific sound (e.g., buzzer sound) for a fixed period of time. By this construction, the user can confirm that the portable device 11 has moved from the sound and vibration generated from the handy equipment 13.

Furthermore, in the system for reminding a user of carrying a portable device of the third embodiment, each of the control part 47 of the handy equipment 13 and the control part 25 of the portable device 11 performs processing shown in FIGS. 7A to 10B. By the processings, even when the user becomes conscious that he or she does not carry the portable device 11, and forgets where it is housed, he or she can easily locate the portable device 11.

Each of the control part 47 of the handy equipment 13 and the control part 25 of the portable device 11 performs processing to enable the user to easily locate the portable device 11.

Figure 7A:
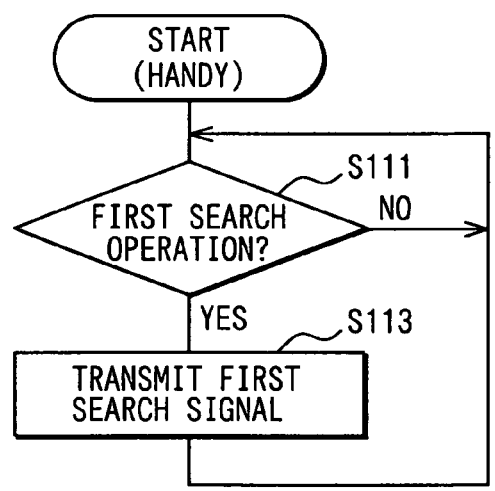
FIGS. 7A and 7B are flowcharts showing processings performed respectively in handy equipment (mobile equipment) and a portable device (electronic key) to achieve a first search function.

As shown in FIG. 7A, the control part 47 of the handy equipment 13 determines at S111 whether a first search operation has been performed by the user, and waits until the first search operation is performed. The first search operation denotes such an operation that the search button 43 of the buttons of the search part 45 is pressed, then a button marked with a number "1" is pressed.

If the first search operation has been performed (S111: YES), in the next S113, the control part 47 feeds transmission data indicating a first search function to the transmitting/receiving part 39 to transmit a first search signal containing the data from the antenna 37, then repeats to execute S111.

Figure 7B:
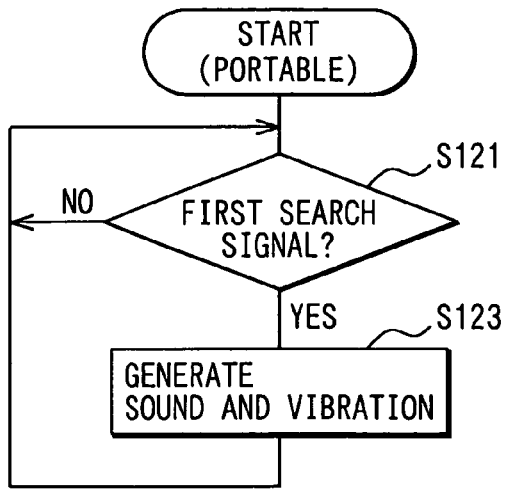

On the other hand, as shown in FIG. 7B, the control part 25 of the portable device 11 determines at S121 whether the first search signal from the handy equipment 13 has been received by the antenna 27 and the transmitting/receiving part 29, and waits until the first search signal is received.

When the first search signal has been received (S121: YES), in the next S123, the control part 25 generates vibration in the vibration part 31 while generating a specific sound (buzzer sound) in the sound output part 23 for a specified time, and then repeats to execute S121.

Figure 8A:
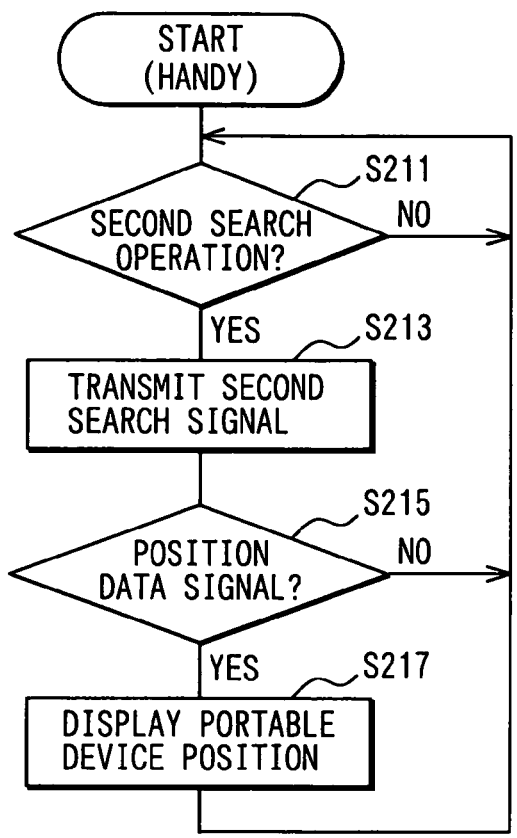
FIGS. 8A and 8B are flowcharts showing processings performed respectively in handy equipment (mobile equipment) and a portable device (electronic key) to achieve a second search function.

As shown in FIG. 8A, the control part 47 of the handy equipment 13 determines at S211 whether a second search operation has been performed by the user, and waits until the second search operation is performed. The second search operation denotes such an operation that the search button 43 of the buttons of the search part 45 is pressed and then a button marked with a number "2" is pressed.

If the second search operation has been performed (S211: YES), in the next S213, the control part 47 feeds transmission data indicating a second search function to the transmitting/receiving part 39 to transmit a second search signal containing the data from the antenna 37.

From the portable device 11, by processing of S225 in FIG. 8B described later, a position data signal indicating a current position of the portable device 11 is returned as a response signal. Accordingly, in the next S215, the control part 47 of the handy equipment 13 determines whether the position data signal from the portable device 11 has been received by the antenna 37 and the transmitting/receiving part 39 within a specified time after the second search signal had been transmitted at S213.

If the position data signal from the portable device 11 has not been received (S215: NO), the control part 47 repeats to execute S211. If the position data signal is received (S215: YES), the control part 47 proceeds to S217 and displays current position information of the portable device 11 in the display part 41 based on the received position data signal. Specifically, the control part 47 displays a map containing a current position of the portable device 11 in the display part 41 and displays the current position of the portable device 11 on the displayed map distinguishably by a specific mark and color, then repeats to execute S211.

Figure 8B:
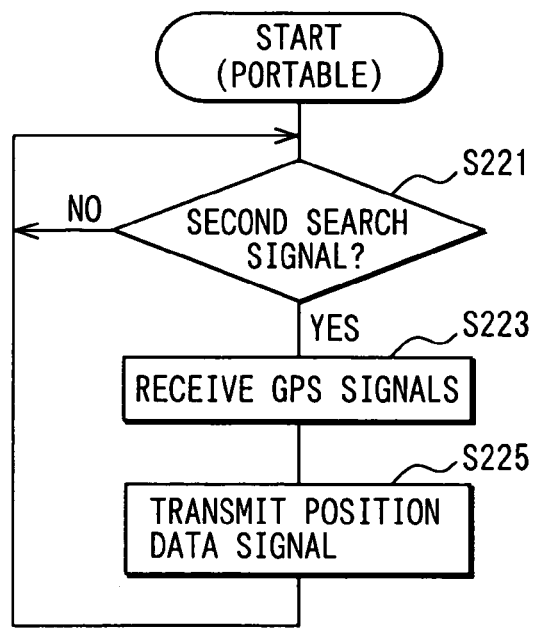

On the other hand, as shown in FIG. 8B, the control part 25 of the portable device 11 determines at S221 whether the second search signal from the handy equipment 13 has been received by the antenna 27 and the transmitting/receiving part 29, and waits until the second search signal is received.

When the second search signal has been received (S221: YES), in the next S223, the control part 25 receives GPS signals from GPS satellites by the antenna 31 and the GPS receiving part 33. Furthermore, at S225, the control part 25 calculates a current position of the portable device 11 from the received GPS signals, feeds position data indicating the current position to the transmitting/receiving part 29, transmits a position data signal containing the position data from the antenna 27 as a response signal, and repeats to execute S221.

Current position information of the portable device 11 displayed in the display part 41 of the handy equipment 13 may be position information (latitude, longitude) of the portable device 11. However, to make the position of the portable device 11 more legible, for example, like on-vehicle navigation devices, a map containing a current position of the portable device 11 is displayed, and the current position of the portable device 11 may be displayed so as to be identifiable by a specific mark on the displayed map. If the portable device 11 calculates a current position from a received GPS signal and transmits a signal indicating the current position as a response signal, the handy equipment 13 can immediately recognize the current position of the portable device 11. If the portable device 11 transmits the contents of the received GPS signal as a response signal without calculating a current position from the GPS signal, the handy equipment 13 may calculate a current position of the portable device 11 from the response signal.

Figure 9A:
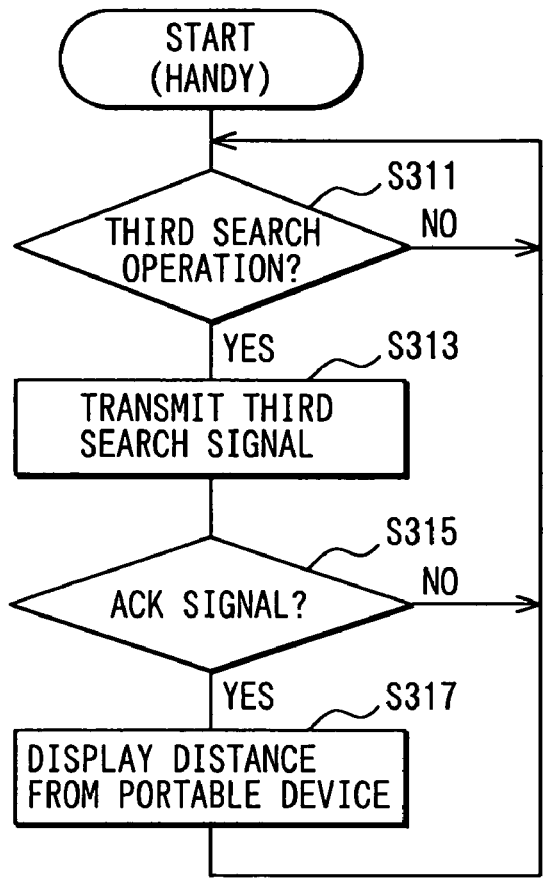
FIGS. 9A and 9B are flowcharts showing processings performed respectively in handy equipment (mobile equipment) and a portable device (electronic key) to achieve a third search function.

As shown in FIG. 9A, the control part 47 of the handy equipment 13 determines at S311 whether a third search operation has been performed by the user, and waits until the third search operation is performed. The third search operation denotes such an operation that the search button 43 of the buttons of the search part 45 is pressed and then a button marked with a number "3" is pressed.

If the third search operation has been performed (S311: YES), in the next S313, the control part 47 feeds transmission data indicating a third search function to the transmitting/receiving part 39 to transmit a third search signal containing the data from the antenna 37.

From the portable device 11, by processing of S323 in FIG. 9B described later, an ACK (acknowledgement) signal is returned as a response signal indicating that the third search signal has been received. Accordingly, in the next S315, the control part 47 of the handy equipment 13 determines whether the ACK signal from the portable device 11 has been received by the antenna 37 and the transmitting/receiving part 39 within a specified time after the third search signal had been transmitted at S313.

If the ACK signal from the portable device 11 has not been received (S315: NO), the control part 47 repeats to execute S311. If the ACK signal is received (S315: YES), the control part 47 proceeds to S317, calculates a distance from the portable device 11 based on the reception strength of the received ACK signal, displays the value of the calculated distance in the display part 41 as distance information, and then repeats to execute S311.

Figure 9B:
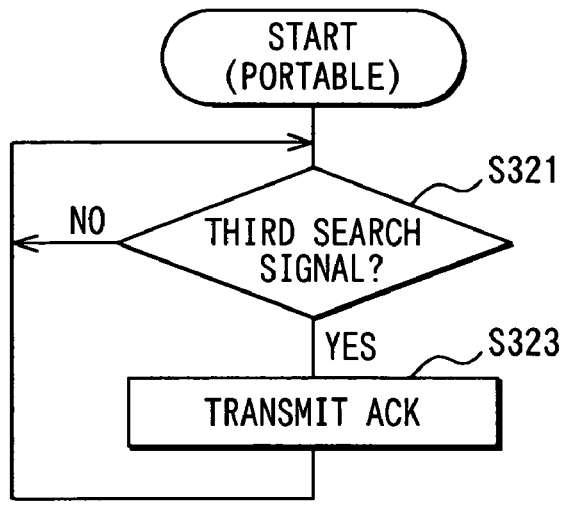

On the other hand, as shown in FIG. 9B, the control part 25 of the portable device 11 determines at S321 whether the third search signal from the handy equipment 13 has been received by the antenna 27 and the transmitting/receiving part 29, and waits until the second search signal is received.

If the third search operation signal has been received (S321: YES), in the next S323, the control part 25 feeds ACK data indicating that the third search signal has been received, to the transmitting/receiving part 29, transmits an ACK signal containing the data from the antenna 27 and then repeats to execute S321.

Figure 10A:
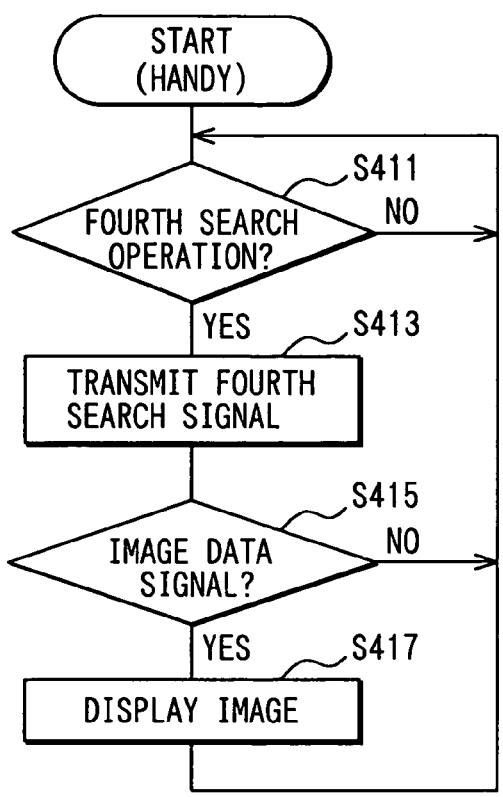
FIGS. 10A and 10B are flowcharts showing processings performed respectively in handy equipment (mobile equipment) and a portable device (electronic key) to achieve a fourth search function.

As shown in FIG. 10A, the control part 47 of the handy equipment 13 determines at S411 whether a fourth search operation has been performed by the user, and waits until the fourth search operation is performed. The fourth search operation denotes such an operation that the search button 43 of the buttons of the search part 45 is pressed and then a button marked with a number "4" is pressed.

If the fourth search operation has been performed (S411: YES), in the next S413, the control part 47 feeds transmission data indicating a fourth search function to the transmitting/receiving part 39 to transmit a fourth search signal containing the data from the antenna 37.

From the portable device 11, by processing of S425 in FIG. 10B described later, an image data signal containing the image data of the surrounding area of the portable device 11 photographed in the photographing part 29 is returned. Accordingly, in the next S415, the control part 47 of the handy equipment 13 determines whether the image data signal from the portable device 11 has been received by the antenna 37 and the transmitting/receiving part 39 within a specified time after the fourth search signal had been transmitted at S413.

If the image data signal from the portable device 11 has not been received (S415: NO), the control part 47 repeats to execute S411. If the image data signal is received (S415: YES), the control part 47 proceeds to S417 and displays an image (that is, the image of the photographed surrounding area of the portable device 11) represented by the image data contained in the received image data signal.

Figure 10B:
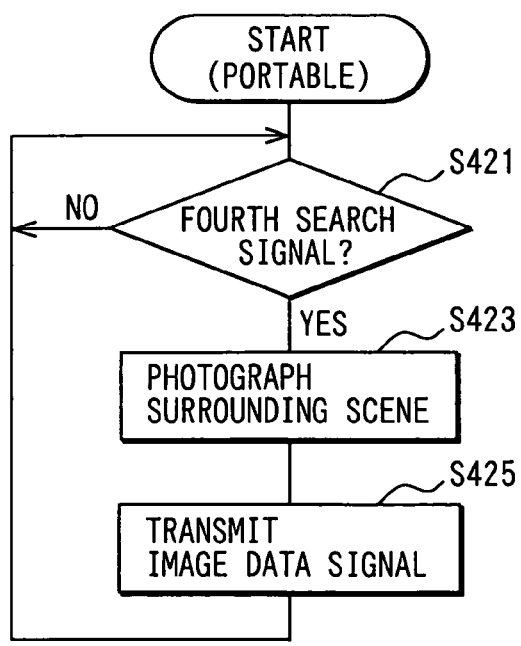

On the other hand, as shown in FIG. 10B, the control part 25 of the portable device 11 determines at S421 whether the fourth search signal from the handy equipment 13 has been received by the antenna 27 and the transmitting/receiving part 29, and waits until the fourth search signal is received.

If the fourth search signal has been received (S421: YES), in the next S423, the control part 25 activates the photographing part 29. The photographing part 29 photographs its front scenes in the vicinity of the portable device 11.

Furthermore, at S425, the control part 25 feeds the image data photographed by the photographing part 29 to the transmitting/receiving part 29 to transmit an image data signal containing the image data from the antenna 27, and repeats to execute S421.

By the processing of FIGS. 7A to 10B, even when the user forgets where the portable device 11 is housed, by performing the first to fourth search operations on the handy equipment 13, he or she can easily locate the portable device 11.

When the first search operation is performed for the handy equipment 13, the first search signal is transmitted from the handy equipment 13 to the portable device 11 (S111: YES, S113). On receiving the first search signal (S121: YES), the portable device 11 generates sound and vibration (S123). As a result, the user can easily locate the position of the portable device 11 by the sound and vibration from the portable device 11. The first search function is effective particularly when the portable device 11 is comparatively near the user. The portable device 11 may be constructed to generate only one of sound and vibration at S123 of FIG. 7B.

When the second search operation is performed for the handy equipment 13, the second search signal is transmitted from the handy equipment 13 to the portable device 11 (S211: YES, S213). On receiving the second search signal (S221: YES), the portable device 11 receives a GPS signal (S223), calculates a current position from the received GPS signal, and transmits a position data signal containing position data indicating the calculated current position to the handy equipment 13 (S225). Based on the position data signal from the portable device 11, the handy equipment 13 displays current position information of the portable device 11 in the display part 41 (S215: YES, S217). As a result, the user can easily determine the position of the portable device 11 from information displayed in the display part 41 of the handy equipment 13. The second search function is effective particularly when the portable device 11 is comparatively distant from the user (specifically, a place more distant than the resolution of position measuring by the GPS signal).

In this embodiment, the portable device 11 calculates a current position from a GPS signal and returns a position data signal indicating the current position to the handy equipment 13. However, at S225 of FIG. 8B, the portable device 11 may transmit a signal indicating the contents of the GPS signal (information such as the position and time of the GPS satellite) received at S223 as a response signal, while the handy equipment 13 may calculate a current position of the portable device 11 based on the signal from the portable device 11, and display the calculated current position in the display part 41 at S217 of FIG. 8A.

When the third search operation is performed for the handy equipment 13, the third search signal is transmitted from the handy equipment 13 to the portable device 11 (S311: YES, S313). On receiving the third search signal (S321: YES), the portable device 11 transmits an ACK signal to the handy equipment 13 (S323). The handy equipment 13 calculates a distance from the portable device 11 based on the reception strength of the ACK signal from the portable device 11, and displays the value of the calculated distance in the display part 41 (S315: YES, S317). Therefore, the user can know a distance from the portable device 11 from the value displayed in the display part 41 of the handy equipment 13, and can easily locate the portable device 11 from the distance. The third search function is effective particularly when the distance between the user and the portable device 11 is greater than effective distances (e.g., within several meters) of the first search function and smaller than effective distances (e.g., several tens of meters or longer) of the second search function.

The handy equipment 13 may, at S317 of FIG. 9A, display the value of the reception strength of the ACK signal in the display part 41 as information about distance from the portable device 11. In this case, if a conversion table for converting the values of reception strength displayed in the display part 41 into distances is prepared in advance, the user can know distance from the portable device 11 from the conversion table.

When the fourth search operation is performed for the handy equipment 13, the fourth search signal is transmitted from the handy equipment 13 to the portable device 11 (S411: YES, S413). On receiving the fourth search signal (S421: YES), the portable device 11 photographs the surrounding area of the portable device 11 by the photographing part 35 (S423), and transmits image data produced by the photographing to the handy equipment 13 (S425). The handy equipment 13 displays an image represented by the image data from the portable device 11 in the display part 41 (S415: YES, S417). Therefore, the user can determine the position of the lost portable device 11 from the image displayed in the display part 41. The fourth search function can determine the position of the portable device 11 more correctly in combination with the first to the third search functions.

By the first to the fourth search functions described above, the user can efficiently locate the lost portable device 11.

[Variant]

Figure 11:
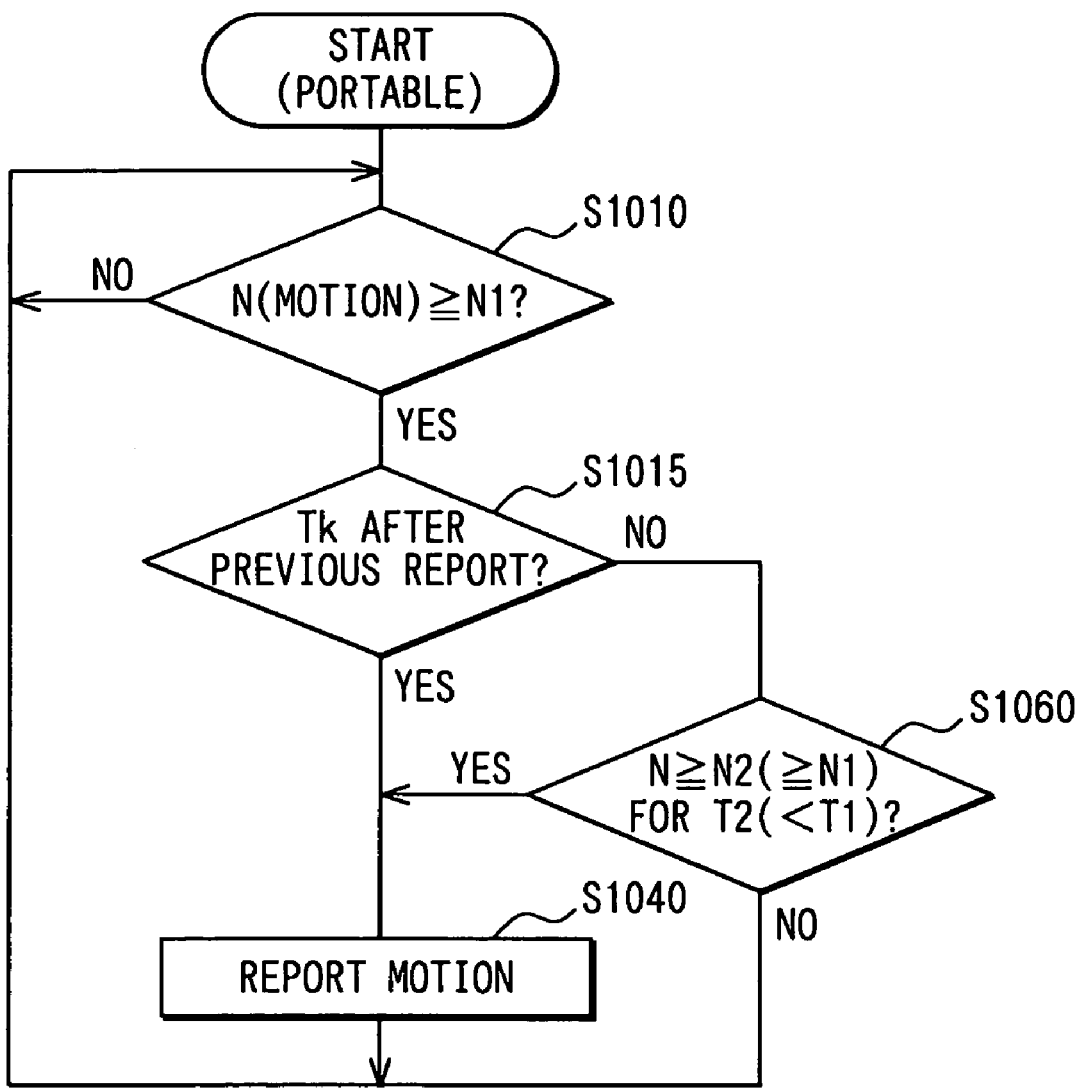
FIG. 11 is a flowchart showing a variant of processing performed in a control part of a portable device to remind a user of carrying carry the portable device.

For example, in the portable device 11 of the first or second embodiment, the control part 25 may perform processing of FIG. 11 instead of the processing of FIG. 2. In this variant, as shown in FIG. 11, the control part 25 of the portable device 11 determines at S1010 whether a motion N detected by the motion detection sensor 17 is equal to or greater than a first reference value N1, and waits until the detected value becomes equal to or greater than the first reference value N1.

On determining that the motion detected by the motion detection sensor 17 is equal to or greater than the first reference value N1 (S1010: YES), the control part 25 determines that the portable device is moving, and executes S1015.

The control part 25 determines at S1015 whether a specified time Tk (e.g., 60 minutes) has elapsed after previous execution of reporting processing of S1040. If Tk has elapsed, it executes S1040 to report to the user that the portable device has moved. In short, like the portable device 11 of the first or second embodiment, the control part 25 generates vibration in the vibration generation part 23 while generating a specific sound in the sound output part 19 for a fixed period of time, and then repeats S1010.

The first time that it is determined at S1010 that the motion detected by the motion detection sensor 17 is equal to or greater than the first reference value N1 after the control part 25 starts operation, the control part 25 executes S1040 to perform the reporting processing.

On the other hand, when it is determined at S1015 that the specified time Tk has not elapsed after previous execution of the reporting processing at S1040 (S1015: NO), the control part 25 executes S1060 to determine whether the motion detected by the motion detection sensor 17 has been equal to or greater than a second reference value N2 (>N1) over a fixed period of time T2 (e.g., two seconds or more).

When negative determination is made at S1060, the control part 25 repeats S1010. When positive determination is made at S1060 (that is, the motion detected by the motion detection sensor 17 has been equal to or greater than the second reference value N2 over a fixed period of time T2), the control part 25 executes S1040 to perform the above reporting processing, and then repeats s1010.

Also in the portable device 11 of the variant described above, when it is detected at S1010 that the portable device 11 has moved, the reporting processing of S1040 is performed. Therefore, user's forgetting to carry the portable device 11 can be prevented.

Yet, since the reporting processing of S1040 is not performed even in the case where it is determined at S1010 that the portable device 11 has moved unless the specified time Tk has elapsed after its previous execution, like the portable device 11 of the first or second embodiment, the user is freed from the annoyance of the sound and vibration generated each time the portable device 11 moves, and undesired consumption of an internal battery of the portable device 11 can be prevented.

Furthermore, in the portable device 11 of the variant, even in the case where less time than the specified time Tk has elapsed after previous execution of the reporting processing of S1040, if the portable device 11 is moved strongly to such a degree that positive determination is made at S1060, the reporting processing of S1040 is performed to generate sound and vibration. Therefore, also in the portable device 11, to locate the portable device 11, if the user intentionally strongly swings a jacket or bag containing the portable device 11, sound and vibration will be generated regardless of elapsed time after previous execution of the reporting processing at S1040. Hence, the user never fails to confirm the existence of the portable device 11 if he or she needs the confirmation.

This variant can also apply to the portable device of the third embodiment.

The above embodiments are not limited to such embodiments and may be implemented in various ways without changing the main purports of the present invention. For example, although the portable device in the above embodiments are used in an electronic key system for motor vehicle, the present invention can also apply to electronic key systems of various key entry systems for such as homes, buildings and the like other than vehicles.

What is claimed is:

1. A portable device for an electronic key system, the portable device comprising:
   a first motion detecting means for detecting a first motion of a portable device from a standing state;
   a reporting means for reporting to a user that the portable device has moved when the motion detecting means detects that the portable device has moved;
   a sound input means for inputting sound from outside;
   a sound detection means for detecting whether sound inputted by the sound input means is sound registered in advance; and
   a reporting operation execution means performs a reporting operation for reporting a current position of the portable device when the sound detecting means detects that the sound inputted is the sound registered.

2. The portable device according to claim 1, wherein the reporting means activates when the first motion detecting means detects that the portable device has moved after a continuation of standing over a first period of time.

3. The portable device according to claim 2, further comprising: a second motion detecting means for detecting a second motion of the portable device occurring continuously over a second period of time shorter than the first period of time with a degree greater than that of the first motion, wherein the reporting means activates when the second motion is detected by the second motion detecting means irrespective of an elapse of the first period of time.

4. The portable device according to claim 1, wherein the reporting means activates only when a first period of time has elapsed after its previous activation even if the first motion detecting means detects the first motion.

5. The portable device according to claim 4, further comprising: a second motion detecting means for detecting a second motion of the portable device occurring continuously over a second period of time shorter than the first period of time with a degree greater than that of the first motion, wherein the reporting means activates when the second motion is detected by the second motion detecting means irrespective of an elapse of the first period of time after a previous activation thereof.

6. The portable device according to claim 1, wherein the reporting means generates at least one of sound and vibration as an operation for reporting to the user that the portable device has moved.

7. The portable device according to claim 1, wherein the reporting means, as an operation for reporting to the user that the portable device has moved, wirelessly transmits a command signal for reporting to the user that the portable device has moved, to handy equipment separate from the portable device.

8. A system for reminding a user of carrying a portable device, comprising:
the portable device according to claim 7; and
handy equipment separate from the portable device, wherein, on receiving a command signal from the portable device, the handy equipment reports to the user that the portable device has moved.

9. The system according to claim 8, wherein the handy equipment, as an operation for reporting to the user that the portable device has moved, displays an image indicating that the portable device has moved in a display part thereof.

10. The system according to claim 8, wherein the handy equipment generates at least one of sound and vibration, as an operation for reporting to the user that the portable device has moved.

11. The system according to claim 8, wherein:
the portable device includes a reporting operation execution means that performs a reporting operation for reporting a current position of the portable device on receiving a search signal transmitted from the handy equipment; and
the handy equipment includes a search signal transmitting means transmits the search signal when a predetermined operation is performed.

12. The system according to claim 11, wherein the reporting operation execution means generates at least one of sound and vibration as the reporting operation.

13. The system according to claim 11, wherein:
the reporting operation execution means, as the reporting operation, receives a GPS signal and transmits a signal indicating a current position calculated from the received GPS signal or contents of the received GPS signal to the handy equipment as a response signal; and
the handy equipment displays current position information of the portable device in a display part thereof based on the response signal.

14. The system according to claim 11, wherein:
the reporting operation execution means transmits, as the reporting operation, a response signal for the search signal to the handy equipment; and
the handy equipment displays information indicating a distance from the portable device in a display part thereof based on a reception strength of the response signal.

15. The system according to claim 11, wherein:
the portable device is provided with a camera;
the reporting operation execution means as the reporting operation, photographs a surrounding area of the portable device by the camera and transmits the photographed image data to the handy equipment; and
the handy equipment displays an image represented by the image data in a display part thereof.

16. The portable device according to claim 1 further comprising:
a sound input means for inputting sound front outside;
a sound detecting means for detecting that magnitude of sound inputted by the sound input means is equal to or greater than a specified value; and
a reporting operation execution means for reporting a current position of the portable device when the sound detecting means detects a large magnitude of sound.

17. The portable device according to claim 1, wherein the reporting operation execution means generates at least one of sound and vibration as the reporting operation.

* * * * *